United States Patent [19]

Devaud et al.

[11] 4,333,154
[45] Jun. 1, 1982

[54] DEVICE FOR DETERMINING THE DIRECTION OF A LINE OF SIGHT

[75] Inventors: Jacques Devaud, Chabeuil; Jean-Robert Costet; Michel Moulin, both of Valence, all of France

[73] Assignee: Crouzet, Paris, France

[21] Appl. No.: 127,788

[22] Filed: Mar. 5, 1980

[30] Foreign Application Priority Data

Mar. 9, 1979 [FR] France ................ 79 06311

[51] Int. Cl.³ .................. G01B 7/00; G06F 15/20
[52] U.S. Cl. ..................... 364/559; 356/152; 324/226
[58] Field of Search .......... 364/443, 444, 449, 453, 364/454, 559; 356/152; 350/16; 235/404; 324/226; 358/210

[56] References Cited

U.S. PATENT DOCUMENTS

| | | | |
|---|---|---|---|
| 3,205,303 | 9/1965 | Bradley | 358/210 |
| 3,723,005 | 3/1973 | Smith et al. | 356/152 |
| 4,028,725 | 6/1977 | Lewis | 356/152 |
| 4,070,674 | 1/1978 | Buell et al. | 364/453 |
| 4,148,026 | 4/1979 | Gendreu | 356/152 |
| 4,209,254 | 6/1980 | Reymond et al. | 356/152 |

Primary Examiner—Errol A. Krass
Assistant Examiner—Gary Chin
Attorney, Agent, or Firm—Holman & Stern

[57] ABSTRACT

In a device for determining the direction of a line of sight, or the orientation of a sighting trihedron associated with said line of sight, defined by a magnetic azimuth angle, an elevation angle and an inclination angle determined in a reference trihedron, a sighting unit defines the sighting trihedron and a gravimetric detector measures components of the gravity acceleration vector in the sighting trihedron. A microprocessor computes the elevation and inclination angles in terms of the components of the gravity acceleration vector, and a magnetometric detector measures components of the earth magnetic field vector in the sighting trihedron. The sighting and reference trihedrons define long and cross axes and the microprocessor computes the components of the earth magnetic field vector along long and cross axes in terms of the components of the earth magnetic field vector. The magnetic azimuth angle is computed in terms of the components along the long and cross axes.

8 Claims, 6 Drawing Figures

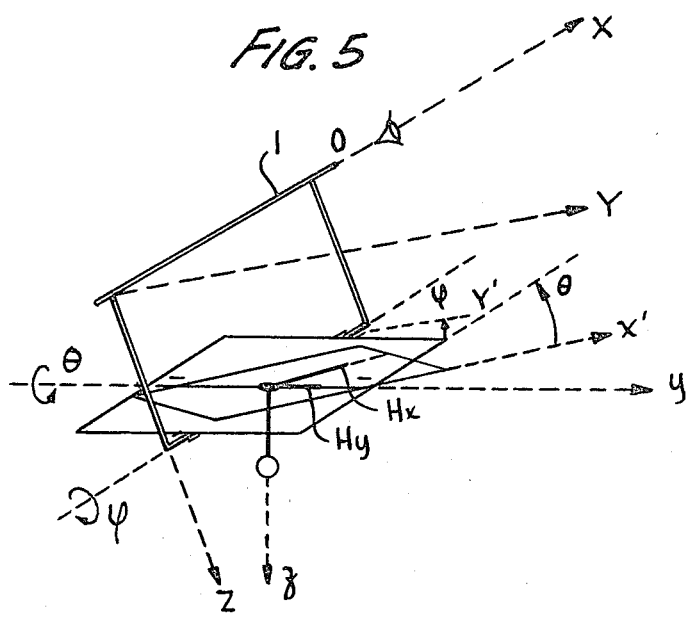
FIG. 5
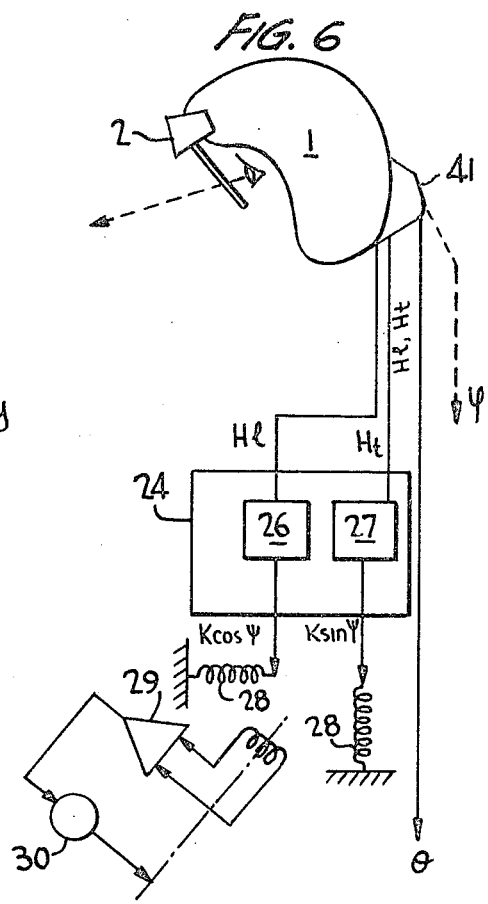
FIG. 6
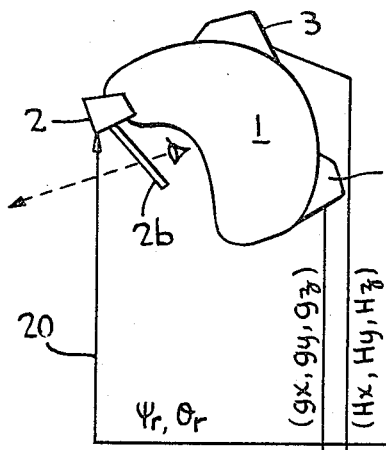
FIG. 4
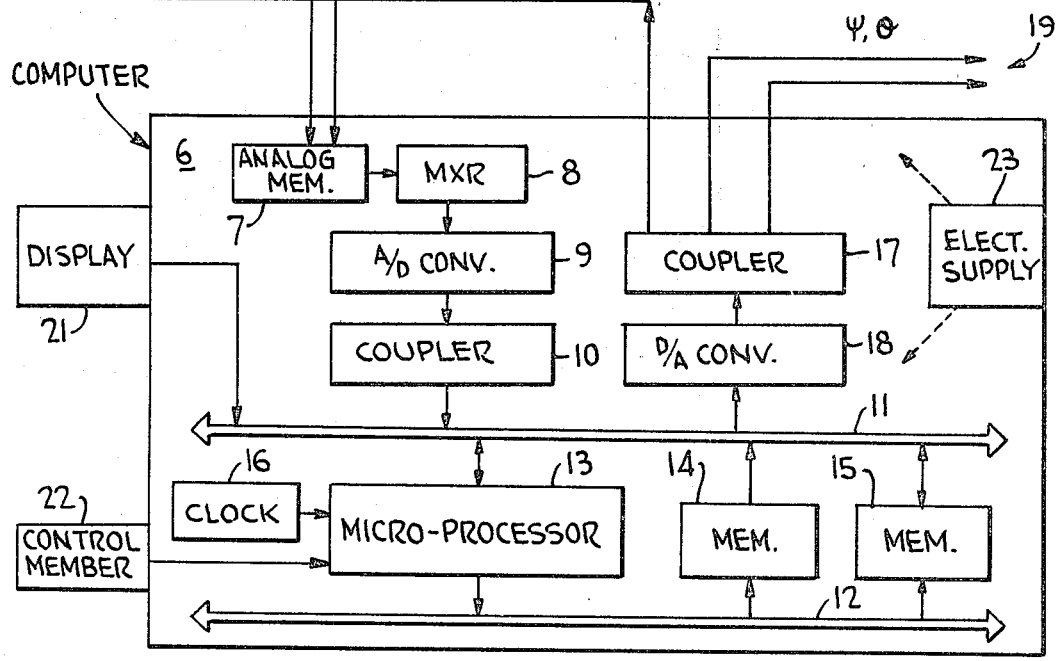

DEVICE FOR DETERMINING THE DIRECTION OF A LINE OF SIGHT

BACKGROUND OF THE INVENTION

The present invention relates to devices for defining and measuring in space the orientation of a sighting trihedron with respect to known geographical points such as the cardinal points and the vertical, to determine angles of magnetic azimuth and elevation, thus defining a line of sight.

It is known to determine a line of sight by visual detection and oral transmission of the directions with respect to a compass, but this method is static and does not enable a target to be followed up. Radar or laser systems are also known, but they require a large and expensive infrastructure.

SUMMARY OF THE INVENTION

The device forming the subject matter of the present invention has the advantage of being self-contained, requiring no outside equipment for adjustment. It does not comprise any ground infrastructure and gives the orientation of a line of sight at each instant in dynamics, i.e. even when said line moves as is the case in the follow-up of a target. The information, obtained in the form of electric (digital or analog) signals, may be used directly in an aiming or pre-aiming control of a tool or a weapon.

The device according to the invention comprises optical sighting means of brilliant viewfinder type, materialising an axis or a trihedron, a magnetic detector, a gravimetric detector, a rigid structure such as a helmet enabling the detectors to be fast with the sighting unit and a computer for processing in known manner the information from the detectors and for calculating the angles defining the position of the sighting point with respect to the geographic trihedron (angle of magnetic azimuth, angle of elevation, angle of inclination).

The magnetic and gravimetric detectors respectively measure the components of the $\vec{H}$ vector (the earth magnetic field) and of the $-\vec{g}$ vector (acceleration of gravity) in the sighting trihedron.

The accelerometer is fixed to the base of the helmet, near the centre of rotation of the operator's head to avoid it being subjected to the accelerations due to the movements of rotation of the head.

In addition, from the parameters defining the orientation of the sighting trihedron and from information coming from the outside and introduced into the computer, an index may be made to appear in the sighting unit which represents a privileged direction of observation in harmony with the operator's head.

The various features of novelty which characterized the invention are pointed in the above description, with reference to the accompanying drawings.

BRIEF DESCRIPTION OF THE DRAWINGS

FIG. 4 shows a block diagram of the sighting system of the invention;

FIG. 5 shows a perspective view illustrating the operation of the system of the invention, and FIG. 6 shows the preferred embodiment of the system of the invention.

DETAILED DESCRIPTION OF THE PREFERRED EMBODIMENT OF THE INVENTION

The measurements of the $\vec{g}$ and $\vec{H}$ vectors, gravity acceleration vector and earth magnetic field vector, enable the three angles (magnetic azimuth, elevation and inclination) to be identified which define the passage of the geographic point (North, East, Vertical axes) to the sighting trihedron.

Figure 1:
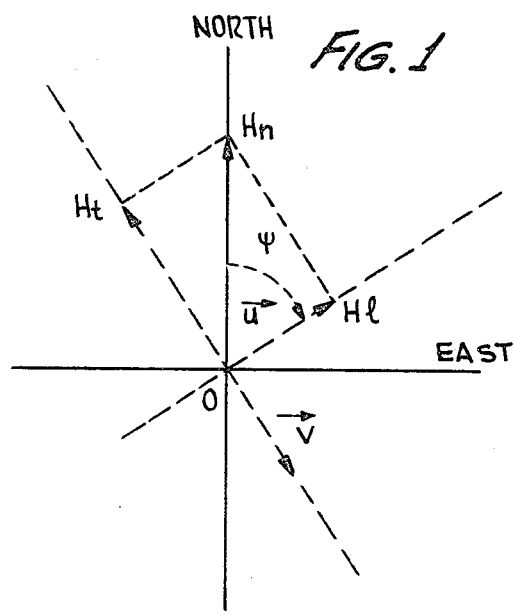
FIG. 1 shows the horizontal projections of the earth magnetic field.

This is only possible outside of the North and South poles of the earth where the two vectors $\vec{g}$ and $\vec{H}$ are not colinear. The vector $\vec{g}$ does not give any azimuth information since it is carried by the vertical axis. The determination of the azimuth angle is effected with the aid of horizontal projections of the earth magnetic field vector $\vec{H}$, as presented in FIG. 1.

The "long" axis is the horizontal projection of the line of the two origins of the sighting and reference trihedrons on the horizontal plane OEN of the reference trihedron. The "cross" axis is perpendicular to the "long" axis in this place. The component of the earth magnetic field along the "long" axis makes an angle $\psi$ with the magnetic north, this angle being the desired magnetic azimuth angle and may be represented as follows:

$$\psi = Arc\ tg\left(-\frac{h_t}{h_l}\right) = \tag{2}$$

$$Arc\ tg\left(\frac{H_z \sin\phi - H_y \cos\phi}{H_x \cos\theta + H_y \sin\theta \sin\phi + H_z \sin\theta \cos\phi}\right) + k\pi$$

wherein $\psi$ is the magnetic azimuth angle of the line of sight; $\theta$ is the elevation angle of the line of sight; and $\psi$ is the inclination angle of the line of sight.

The calculation of the components $h_l$ and $h_t$ necessitates the knowledge of the angles of elevation and of inclination of the sighting trihedron which is also the measuring trihedron. These angles will have been previously determined by the computer from the measurements of the components of $-\vec{g}$.

Figure 2:
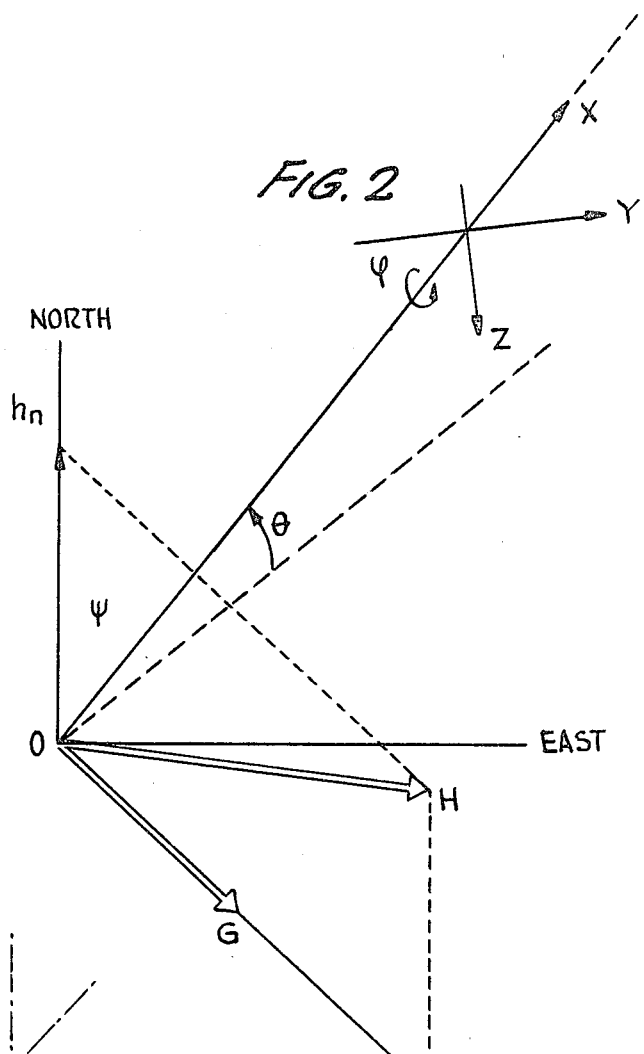
FIG. 2 shows the geographic and sighting points.

Using the definitions of the geographic point (O,N,E,V) of the sighting point (O,X,Y,Z) and the angles indicated in FIG. 2, the components of the vector $-\vec{g}$ are deduced in the sighting trihedron:

$$\begin{cases} g_x = g \sin(\theta) \\ g_y = -g \sin(\phi) \cos(\theta) \\ g_z = -g \cos(\phi) \cos(\theta) \end{cases}$$

with g: module of the gravity acceleration vector. $g_x$, $g_y$, $g_z$: measurements recorded by the triaxial accelerometer.

The angles of elevation and of inclination are simply deduced therefrom:

$$\sin(\theta) = \frac{g_x}{\sqrt{g_x^2 + g_y^2 + g_z^2}}$$

$$tg(\phi) = \frac{g_y}{g_z}$$

The angles $\theta$ and $\psi$ are in all cases defined without ambiguity in the range:

$\theta$ from $-90°$ to $+90°$ $\psi$ from $-90°$ to $+90°$

The angle $\psi$ is defined by formula 2. The ambiguity of the definition to within $K\pi$ is removed by examining the sign of the denominator of the fraction of this same formula 2 which represents, to within a positive factor, the cosine of $\psi$.

Figure 3:
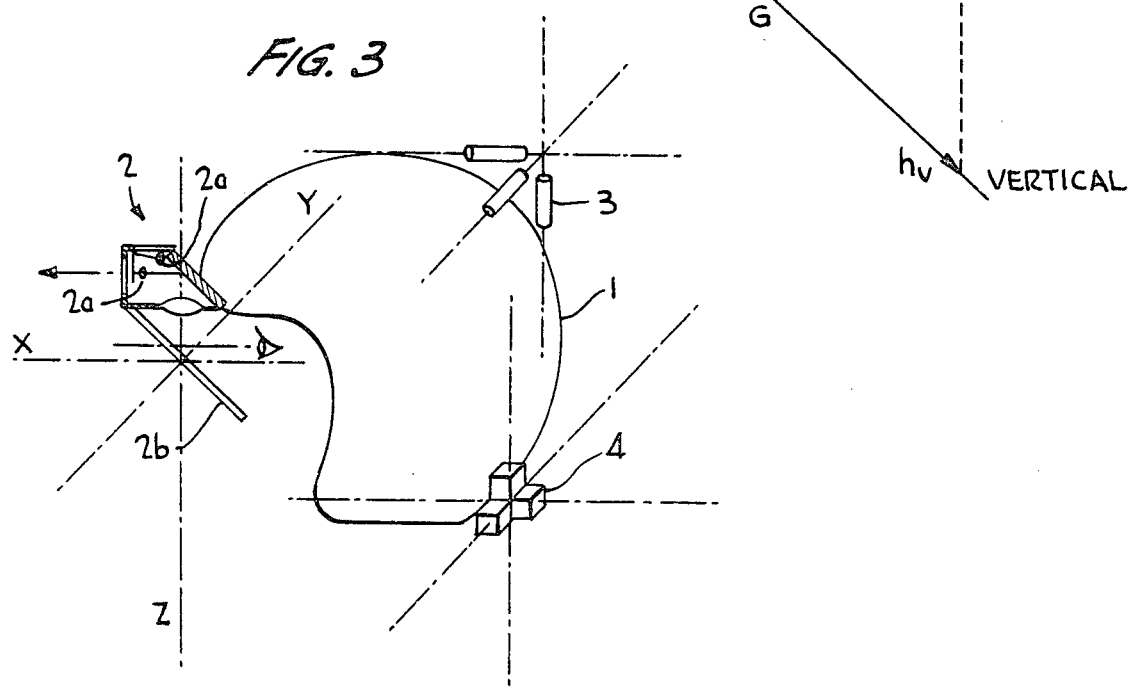
FIG. 3 shows the helmet of the system of the invention.

By way of example in FIG. 3, the device is composed of a helmet 1 made of non-magnetic, rigid material, on which are fixed:

a sighting unit 2 provided with a semi-silvered mirror 2b which superposes on the outer landscape the visual image of a reticule collimated at infinity;

a triaxial magnetometer 3 of the "controlled flux valve" type;

a triaxial accelerometer 4 advantageously disposed at the observer's nape.

A useful addition to the system consists in disposing in the sighting unit a mobile index controlled by the indications of the computer to materialise, by the crossing of the needles of two galvanometers 2a, the direction of appearance of a target, to allow the operator to orient the line of sight in this direction.

FIG. 4 is a block diagram of the sighting system: measurement and exploitation. The information furnished by the magnetometer 3 and the accelerometer 4 are exploited in a processing circuit comprising an analog memory 7, a multiplexer 8, an analog-to-digital converter 9, an input coupler 10, data and address buses 11 and 12, respectively, a microprocessor 13, a program read-only memory 14, a main memory 15, a clock 16, an output coupler 17, a digital-to-analog converter 18 (continuously giving the values of $\psi$ and $\theta$ on outputs 19). Via line 20, the processing circuit gives signals representing the relative elevation and bearing $\theta_r$ and $\psi_r$, of the privileged direction in the sighting point 2, enabling a mobile index, such as the two galvanometers 2a, to be positioned.

A display member 21 allows the introduction of the outside data relative to the privileged direction to be located by the index 2a, $\theta_o$, $\psi_o$, $D_o$, (elevation, magnetic azimuth and distance at which the target is seen by an outside observation post). The processing circuit further comprises control members 22 and self-contained electrical supplies 23.

The operator is provided with the "sighting helmet" device. The axes of the detectors, static triaxial magnetometer 3 and triaxial accelerometer 4 are harmonised with the sighting trihedron materiallised by the collimator 2. The detectors 3 and 4 receive the electrical energy from the self-contained electrical supply 23, of the battery or cell type, located in the casing of the processing circuit. These detectors deliver electric D.C. signals representing the components of $\vec{H}$ and of $-\vec{g}$, earth magnetic field vectors and vector opposite the gravity acceleration vector, in the sighting trihedron.

The processing circuit 6 receives these signals through the acquisition module 7, 8, 9, 10. The analog memory 7 synchronises the acquisitions of the signals from the detectors. The multiplexer 8 controlled by the microprocessor 13 enables the analog-to-digital conversion 9 to be switched onto each of the input channels successively.

The input coupler 10 makes it possible to present on the data bus 11 of the microprocessor the input information, coded in adequate form, to be recognized by the microprocessor. The microprocessor, synchronised on the clock 16 and controlled by the member 22 at the disposal of the operator provided with its read-only memories 14 and its main memories 15, makes the following calculations:

$\psi$ and $\theta$, magnetic azimuth and elevation of the line of sight;

$\psi_r$ and $\theta_r$, bearing and elevation relative to the privileged direction in the sighting trihedron, for positioning the mobile index.

This information 19 and 20 is available at the output in the form of electric analog signals after the output coupler 17 and the digital-to-analog converter 18.

However, in the case of use of the index 2a, initially the operator should have introduced, with the display member 21 or automatically by electrical transmission, the data coming from an outside observation post;

$\theta_o$, $\psi_o$, $D_o$ elevation and magnetic azimuth and distance from the target with respect to the observation post;

$\psi_d$, D azimuth and distance of the operator with respect to the observation post.

For simplified embodiments, the device may function with a bi-axial accelerometer along the axes OX and OY of the sighting trihedron. In this case, it is assumed that the module of $\vec{g}$ is locally known with suitable accuracy. It may also function with a bi-axial accelerometer along the axes OX and OZ of the sighting trihedron, and in this case, it is assumed that the inclination $\phi$ is zero, or with a uni-axial accelerometer along OX, assuming both that $|\vec{g}|$ is known and $\phi$ is zero.

According to one embodiment, FIGS. 5 and 6 show a device according to the present invention using a two-axis pendulum magnetometer 41 with D.C. outputs, for example of the "flux valve" type, having angular detectors with electric outputs $\phi$ and $\theta$ about its axes of rotation. The measurements of the horizontal components of the earth magnetic field $H_l$ and $H_t$ are modulated at 400 Hz, for example by modulators 26 and 27.

At the output of the electronic modulation box 24, two signals are obtained, modulated at 400 Hz and representing the terms $\sin \psi$ and $\cos \psi$ to within a scale factor. These signals may be used directly to drive the input windings 28 of a resolver. With a differential amplifier 29 and a motor 30, a control of angular position in azimuth of a turret, for example, is effected. Control in elevation ($\theta$) is effected in similar manner.

The device according to the invention may be used for automatically aiming or pre-aiming weapons or tools in the field of robots.

What we claim is:

1. A device for determining the direction of a line of sight or the orientation of a sighting trihedron associated with said line of sight, defined by a magnetic azimuth angle, an elevation angle and an inclination angle determined in a reference trihedron, said sighting and reference trihedron defining a long axis and a cross axis, said device comprising: a sighting unit defining said sighting trihedron, a gravimetric detector for measuring components of the gravity acceleration vector in the sighting trihedron, computer means connected to said gravimetric detector for computing said elevation and inclination angles in terms of said components of the gravity acceleration vector, a magnetometric detector for measuring components of the earth magnetic field vector in the sighting trihedron, said computer means being connected to said magnetometric detector for computing the components of the earth magnetic field vector along said long axis and said cross axis in terms of said components of the earth magnetic field vector, and for computing said magnetic azimuth angle in terms of said components along said long axis and said cross axis.

2. A device according to claim 1, wherein said sighting unit, said gravimetric detector and said magnetometric detector are assembled on a movable rigid and swivelling structure means.

3. A device according to claim 2, wherein said magnetometric detector is a tri-axial static magnetometer, and said gravimetric detector is a tri-axial accelerometer.

4. A device according to claim 2, wherein said magnetic detector is a tri-axial static magnetometer and said gravimetric detector is a bi-axial accelerometer.

5. A device according to claim 2, wherein said magnetometric detector is a tri-axial magnetometer and said gravimetric detector is a uni-axial accelerometer.

6. A device according to claims 2, 3, 4 or 5, wherein said structure means is a helmet placed on an operator's head.

7. A device according to claims 1, 2, 3, 4 or 5, wherein said sighting unit is an optical system and an index value is produced by said computer means with the said line of sight information.

8. A device according to claim 2, wherein the magnetometric detector is a two-axis pendulum magnetometer.

* * * * *